(12) United States Patent
Dono et al.

(10) Patent No.: US 8,590,117 B2
(45) Date of Patent: Nov. 26, 2013

(54) SLIDE FASTENER

(75) Inventors: Kenji Dono, Toyama (JP); Shunji Akashi, Toyama (JP); Hiroshi Ishisaka, Toyama (JP); Naoyuki Himi, Toyama (JP)

(73) Assignee: YKK Corporation (JP)

( * ) Notice: Subject to any disclaimer, the term of this patent is extended or adjusted under 35 U.S.C. 154(b) by 608 days.

(21) Appl. No.: 12/920,679

(22) PCT Filed: Mar. 26, 2008

(86) PCT No.: PCT/JP2008/055760
§ 371 (c)(1),
(2), (4) Date: Sep. 2, 2010

(87) PCT Pub. No.: WO2009/118846
PCT Pub. Date: Oct. 1, 2009

(65) Prior Publication Data
US 2011/0000053 A1 Jan. 6, 2011

(51) Int. Cl.
*A44B 19/16* (2006.01)
(52) U.S. Cl.
USPC .......... 24/409; 24/403; 24/405; 24/410
(58) Field of Classification Search
USPC .......... 24/410–413, 403, 405, 404, 409
See application file for complete search history.

(56) References Cited

U.S. PATENT DOCUMENTS

| | | | | |
|---|---|---|---|---|
| 2,798,274 A * | 7/1957 | Morin | | 24/410 |
| 3,886,634 A * | 6/1975 | Murata | | 24/410 |
| 4,520,535 A * | 6/1985 | Kasai | | 24/410 |
| 6,681,455 B2 * | 1/2004 | Ichikawa | | 24/389 |
| 6,681,456 B1 * | 1/2004 | Dischler | | 24/406 |
| 2006/0000065 A1 * | 1/2006 | Takasawa et al. | | 24/401 |
| 2006/0130292 A1 * | 6/2006 | Kondo et al. | | 24/403 |
| 2011/0000053 A1 * | 1/2011 | Dono et al. | | 24/399 |

FOREIGN PATENT DOCUMENTS

| | | | | |
|---|---|---|---|---|
| EP | 1886593 A2 * | 2/2008 | | A44B 19/34 |
| JP | 2004-298641 A | 10/2004 | | |
| JP | 2006-15158 A | 1/2006 | | |
| JP | 2008-43432 A | 2/2008 | | |

OTHER PUBLICATIONS

PCT International Search Report and Written Opinion, PCT Application No. PCT/JP08/055760, mailed Jul. 1, 2008.

* cited by examiner

*Primary Examiner* — Robert J Sandy
(74) *Attorney, Agent, or Firm* — Kilpatrick Townsend & Stockton LLP

(57) ABSTRACT

A slide fastener which withstands a predetermined lateral pulling force in a usual usage and is cloven when an excessive lateral pulling force is applied at the time of airbag inflation, wherein the slide fastener in which a plurality of attachment leg portions of coupling teeth, on each of which a coupling head formed to have a relatively large width and the attachment leg portions extending from the coupling head are formed, are attached on a coupling tooth attaching portion of each of a pair of fastener tapes on right and left with a predetermined pitch along a tape longitudinal direction is configured to satisfy a relationship $0.4 \geq (2 \times H - P)/P \geq 0.1$ between a summit height H [mm] of the coupling head formed to have a relatively large width and a pitch P [mm].

2 Claims, 11 Drawing Sheets

$T \fallingdotseq 2r \fallingdotseq H-D$

SLIDE FASTENER

This application is a national stage application of PCT/JP2008/055760 filed on Mar. 26, 2008 which is incorporated herein by reference in its entirety.

FIELD OF THE INVENTION

The present invention relates to a slide fastener which has a predetermined resistance to a lateral pulling force and is capable of being cloven when a lateral pulling force of the cleavage lateral pulling force or larger is applied, and more particularly to a slide fastener which can be applied on an airbag inflation-out opening for allowing the airbag to be inflated out when a vehicle collides.

BACKGROUND ART

In recent years, a side airbag for protecting the heads of passengers when the vehicle collides is mounted on the seat back side portion or the roof portion of the compartment of a vehicle. This side airbag unit includes an inflator for generating inflation gas after a large shock is received due to a vehicle collision and an airbag, which is inflated to expand with the gas supplied from the inflator. The airbag, when stored before the side airbag unit is activated, is folded in a predetermined procedure and stored in the seat back side portion of a vehicle seat or the like, while the side airbag unit itself is covered with a seat cover or the like.

Usually, the surface of the vehicle seat is covered with a seat cover made of fabric or leather for covering the cushion material of the seat and an inflation-out opening to allow the airbag to inflate is formed on a portion of the seat cover on the seat bag side portion where the side airbag unit is provided. Conventionally, this inflation-out opening is sewed together with a brittle sewing thread so that it is cut when pulled by a predetermined force.

This side airbag unit senses a shock when receiving a large shock due to a collision of a vehicle to generate a high pressure gas in the inflator and introduces the gas into the airbag to inflate the airbag at once. When the airbag is inflated, a large pulling force is applied to the sewing thread which sews the inflation-out opening so that the sewing thread is cut by this force so as to open the closed inflation-out opening and then the airbag is inflated out from the opening.

This airbag is expanded sideway of a passenger to support the head, chest and waist of the passenger by absorbing a shock. Consequently, the shock applied to the human body at the time of a collision is cushioned largely to secure the safety of the passengers.

However if a structure for closing the airbag inflation-out opening using the sewing thread is adopted, the manufacturing procedure is limited to have a step of putting the seat cover after the airbag unit is mounted on the seat, which is inconvenient. For a recent vehicle seat, a flexible manufacturing procedure is demanded since diversified auxiliary machines such as a heater, a seat level adjusting actuator and the like are mounted in many cases. Also conventionally, if inspection of the airbag unit is requested after a vehicle is delivered to a customer, the airbag unit can be inspected only after the seat cover is removed, which complicates the working procedure.

Further, the rupture strength of the sewing thread varies largely depending on sewed condition and further, varies largely with a rise of temperature in a room and deterioration due to aging, which cause an inconvenience. If the sewing thread is not likely to be cut out, a serious fault such that the airbag is not inflated out on emergency is caused. If the strength of the sewing thread is low, the sewing thread is cut by a pulling force applied on the seat cover when a passenger sits on the seat resulting in that the inflation-out opening is cloven to expose the seat cushion.

When the airbag is inflated to expand, the sewing thread is cut one by one sequentially and thus, the expansion speed of the airbag drops, which is another inconvenience.

Instead of the structure for closing the inflation-out opening using the sewing thread having such various inconveniences, a closing structure of the inflation-out opening using the slide fastener has attracted attention. By using the slide fastener, the inflation-out opening can be opened and closed by moving the slider up and down even after the slide fastener is sewed on a seat cover. Thus, the flexibility of assembling procedure is intensified thereby facilitating the assembly of a seat having a complicated structure. Further, upon inspection of the airbag unit, its wirings and attaching portion can be inspected easily by opening and closing the slide fastener.

When coupling of coupling teeth in part of a slide fastener in which the coupling teeth are coupled is released and a lateral pulling force (a force per unit length of coupling axis to be applied in a direction for separating the coupling teeth attached to a pair of fastener tapes, right and left) is applied continuously, the coupling of the coupling teeth can be released sequentially with a weak force without moving the slider. Thus, the expansion speed can be accelerated unlikely to a situation of cutting the sewing thread one by one. Accordingly, a slide fastener is preferable for quickly expanding the airbag to protect the passenger effectively. Particularly, because a gap between the head of the passenger and the side glass of a vehicle is small, application of this fastener to a side airbag, which needs to be inflated to expand in a short time after a collision, is expected.

For example, a Patent Document 1 (Japanese Patent Application Laid-Open No. 2006-15158) discloses a slide fastener with an emergency opening means having a structure, which cleaves easily, for use on the inflation-out opening of the airbag.

The coupling tooth of the slide fastener with an emergency opening means described in the Patent Document 1 has a shape including: two leg portions fixed to the fastener tape side edge striding over the coupling tooth attaching portion of the fastener tape side edge; a body portion connecting the two leg portions; a coupling head formed at an external end in order to couple a pair of the coupling teeth on right and left in a lateral pulling force direction; and a neck portion which is constricted and for connecting the coupling head with the body portion. A groove is formed in the summit of the coupling head along a coupling axis. Further, a shoulder portion to be fitted to the groove is formed in the central portion in the width direction of the coupling tooth such that it is projected from the body portion and the neck portion.

The coupling head is fitted into between the neck portions of two adjacent coupling teeth fixed to the other fastener tape disposed to oppose in order to prevent the coupled coupling teeth from being cloven in the lateral pulling force direction. The shoulder portion formed such that it is projected from the neck portion and the body portion of the coupling tooth is fitted to the groove portion provided in the opposed coupling head, thereby preventing right and left fastener stringers from being deviated in a shearing direction which may release the coupling.

In the slide fastener described in the Patent Document 1, two coupling teeth formed in a nose shape having asymmetrical shape in its front and rear sides by cutting out the rear face of the coupling teeth, which are fitted into the shoulder portion of a coupling tooth, are disposed in the central portion of the slide fastener. Such configured portion is easily cloven by a pushing up force from the rear face side of the slide fastener, and thus it serves as a cleavage starting point in the slide fastener when the airbag is inflated out.

Further, a Patent Document 2 (Japanese Patent Application Laid-Open No. 2004-298641) has disclosed a slide fastener having a holding means which serves as a cleavage starting point in order to facilitate the slider fastener to open from the central portion of the slide fastener when an internal pressure is applied by an airbag.

The holding means to be the cleavage starting point in the central portion of the slide fastener disclosed in the Patent Document 2 may be a holding means having a constricted portion of synthetic resin which is broken by an expansion force when the airbag is inflated (see FIG. 1 in the Patent Document 2), a holding means using a welded tape which is broken by an expansion force when the airbag is inflated (see FIG. 3 in the Patent Document 2), a holding means in which a male type engaging head is previously inserted into a engaging hole in the central portions in right and left fastener tapes and the engaging heads are released from the engaging hole by the expansion force when the airbag is inflated (see FIG. 4 in the Patent Document 2), or the like.

Patent Document 1: Japanese Patent Application Laid-Open No. 2006-15158

Patent Document 2: Japanese Patent Application Laid-Open No. 2004-298641

DISCLOSURE OF THE INVENTION

Problems to be Solved by the Invention

Because the slide fastener is used for a closing structure for the inflation-out opening as described above, the inflation-out opening can be opened or closed freely by moving the slider up and down even after a seat cover is sewed on the back rest of a seat. Consequently, the flexibility of assembling procedure is intensified thereby facilitating assembly and inspection of a seat having a complicated structure. The structure using the slide fastener has various features including a feature that the coupling of the coupling teeth row can be released sequentially in a short time with a weak force when the airbag is inflated without moving the slider. However, the cleavage starting point as described in the Patent Documents 1 and 2 is necessary, because the lateral pulling force of the slider fastener is generally set to a large value.

The cleavage starting point formed on the slide fastener with the emergency opening means of the Patent Document 1 has a structure which is cloven easily by a pushing up force from the rear face side of the slide fastener. However, when a pushing up force is equally applied to the rear face of the slide fastener by an expansion of the airbag, mainly a lateral pulling force is applied to the slide fastener. Consequently, the slide fastener with the emergency opening means described in the Patent Document 1 may not be cloven easily at the cleavage starting point.

Because the holding means for the cleavage starting point described in the Patent Document 2 includes a member, which is different from the coupling tooth of the slide fastener, on the coupling axis, the slider cannot pass through the central portion of the slide fastener where the holding means exists. Thus, the inflation-out opening cannot be opened or closed freely by moving up and down the slider. Therefore, the flexibility of the assembling procedure is low and an inspection work is not easy after the seat is assembled.

In the slide fasteners described in the Patent Document 1 and the Patent Document 2, the cleavage starting point needs to be formed in the central portion of the slide fastener. Thus, it is necessary to design and manufacture slide fasteners each having various lengths depending on the type of the seats and secure a stock of slide fasteners of each of various lengths. Therefore, this delays delivery and raises manufacturing cost of the slide fastener.

The present invention has been achieved in views of the above-described inconveniences and an object of the invention is to provide a slide fastener with quick delivery and at a low price, the slide fastener being capable of withstanding a predetermined lateral pulling force in usual use and being forced to be cloven in a short time when an excessive lateral pulling force is applied at the time of airbag inflation out or the like.

Means for Solving the Problems

To achieve the above object, the present invention provides a slide fastener in which a plurality of attachment leg portions of coupling teeth, on each of which, a coupling head formed to have a relatively large width and the attachment leg portions extending from the coupling head are formed, are attached on a coupling tooth attaching portion of each of a pair of fastener tapes on right and left with a predetermined pitch along a tape longitudinal direction, wherein a following relationship between a summit height H [mm] of the coupling head formed to have a relatively large width and a pitch P [mm]: $0.4 \geq (2 \times H - P)/P \geq 0.1$ is satisfied.

Preferably, the coupling teeth are formed by injection molding or made of coil-shape or zigzag-shape mono-filament, and a following relationship among the summit height H [mm] of the coupling head formed to have a relatively large width, a coupling tooth thickness T [mm] of the coupling head and the pitch P [mm]: $0.2 \geq (2 \times H - P) \times T/(2 \times P)$ is satisfied.

Preferably, the coupling teeth are formed of coil-shape or zigzag-shape mono-filament and a following relationship exists among the summit height H [mm] of the coupling head formed to have the relatively large width, a neck width D of the attachment leg portion and the pitch P: $0.2 \geq (2 \times H - P) \times (H - D)/(2 \times P)$ is satisfied.

Further, preferably, when a lateral pulling force of 40 [N/cm] or more is applied as a force per a unit length of coupling line in a direction which is orthogonal to a coupling axis and a direction to separate the pair of the fastener tapes on right and left in a state where the coupling teeth attached to each of the pair of the fastener tapes are coupled with each other along the coupling axis, the coupling of the coupling teeth is released.

Advantages of the Invention

According to the slide fastener of the present invention, the summit height H [mm] of the coupling head formed to have a relatively large width and the pitch P [mm] of the coupling teeth satisfies the relationship of $0.4 \geq (2 \times H - P)/P \geq 0.1$. Consequently, there can be provided a slide fastener which is capable of withstanding a lateral pulling force of less than 40 [N/cm], which is usually applied, and capable of allowing the coupling of the coupling teeth of the slide fastener to be released when an excessive lateral pulling force of 40 [N/cm] or more is applied.

Further, a slide fastener, which is continuous without any particular cleavage starting point and preferable as a closing structure for airbag inflation-out opening, can be provided by manufacturing all the coupling teeth of the slide fastener in a structure satisfying the above-described relationship between the summit height H and the pitch P of the coupling teeth. As a result, diversified slide fasteners of various lengths can be provided with quick delivery and at a low price.

When coupling teeth formed by injection molding or are made of coil-shape or zigzag-shape mono-filament are used in the slide fastener, it is preferable that the summit height H [mm] of the coupling tooth formed to have a relatively large width, the coupling tooth thickness T [mm] of the coupling head and the pitch P [mm] satisfy a relationship of $0.2 \geq (2 \times H - P) \times T/(2 \times P)$. Consequently, the quick expansion property after the coupling of part of the slide fastener is released can be improved.

When coupling teeth formed by coil-shape or zigzag-shape mono-filament are used in the slide fastener, it is preferable that the summit height H [mm] of the coupling tooth formed to have a relatively large width, the neck width D [mm] of the attachment leg portion and the pitch P [mm] satisfy a relationship of $0.2 \geq (2 \times H - P) \times (H - D)/(2 \times P)$. Consequently, the quick expansion property after the coupling of part of the slide fastener is released can be improved.

EXPLANATION OF REFERENCE NUMERALS

Figure 1:
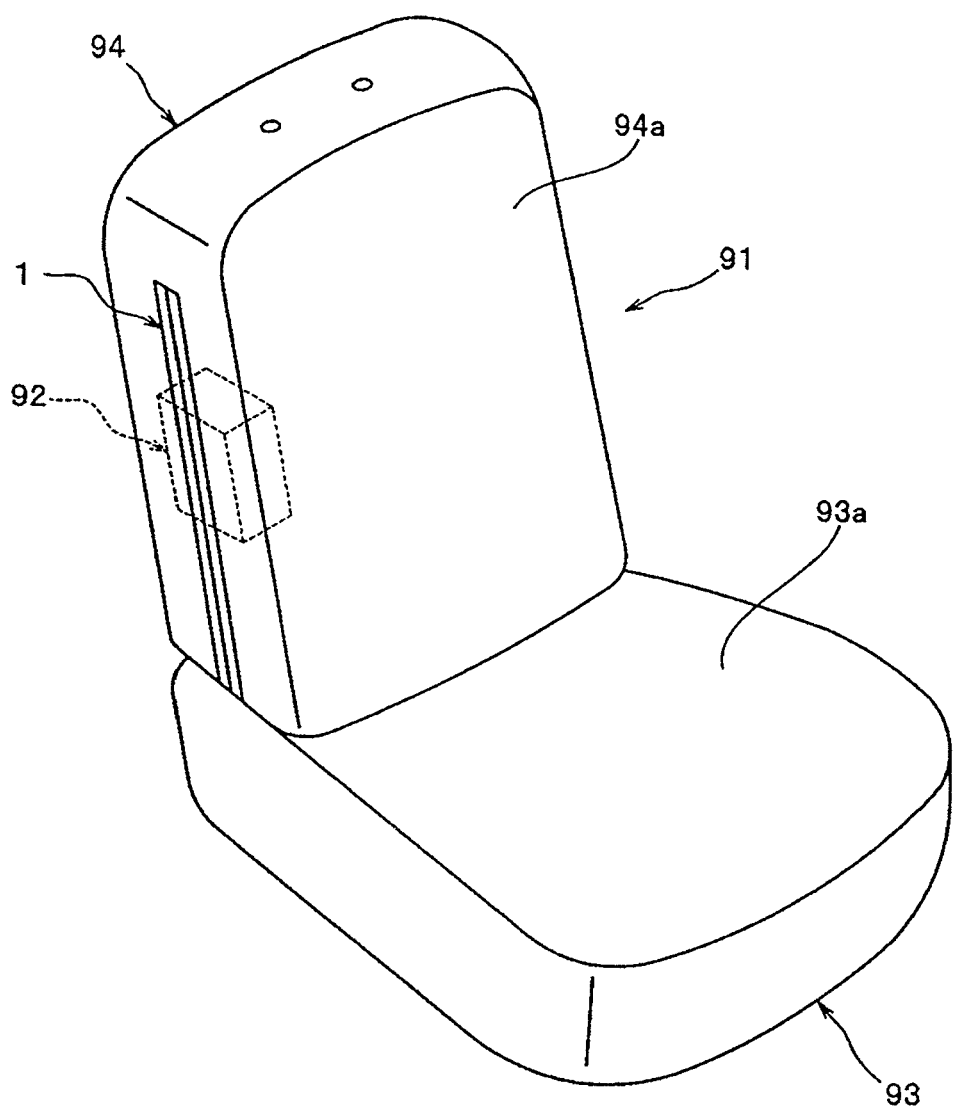
FIG. 1 is a view showing an embodiment of usage where a slide fastener of the present invention is applied to a side of a seat back of a vehicle seat.

1, 110 Slide fastener
12, 112 left coupling teeth
12*a* left coupling teeth row
13, 113 right coupling teeth
13*a* right coupling teeth row
14 core thread
15 sewing thread
16, 616 left fastener tape
17 right fastener tape
50 slider
70, 370, 470, 670, 770, 870 coupling head
72, 472, 672, 872 first leg (attachment leg portion)
73, 473, 673, 873 second leg (attachment leg portion)
74, 75, 674, 675, 874, 875 sewing portion
76 connecting threads
80 brittle portion
84, 85, 86 sewing line
212, 312, 412, 612, 712, 812 coupling teeth
476, 676, 876 turned back connecting portion
710 nipping groove
716, 816 fastener tape
777 neck portion
778 shoulder portion
D neck width
H summit height
T coupling tooth thickness

BEST MODE FOR CARRYING OUT THE INVENTION

Hereinafter, a typical embodiment of the coupling tooth of the present invention and the slide fastener using the same coupling tooth will be described in detail with reference to the accompanying drawings.

FIG. 1 is a view showing an embodiment of usage where the slide fastener of the present invention is applied to a side portion of a seat back of a vehicle seat.

For example, the slide fastener of the present invention can be used for a seat cover opening of a vehicle seat 91 containing a side airbag unit 92 internally. The vehicle seat 91 shown in FIG. 1 includes: a seat cushion 93 composing a seat; and a seat back 94 composing a seat back.

The seat cushion 93 and the seat back 94 contains internally: a seat frame forming the entire shape of the vehicle seat 91; seat springs for equally receiving a pressure of an passenger weight while seating on the vehicle seat 91; a cushion member, which is foamed of synthetic resin formed into a predetermined shape; and the like. The surface of the cushion is covered with seat covers 93*a*, 94*a* made of fabric, leather or the like.

A side airbag unit 92 for largely cushioning a shock to be applied to a passenger head from his/her side by expanding sideway of the passenger when a large shock is received due to a collision of the vehicle is contained in a side portion of the seat back 94. The opening for expansion of this side airbag unit 92 is closed with the slide fastener 1 described previously. Some of the vehicle seats 91 contain an actuator for seat level adjustment, its activating mechanism, a heater for warming the seat surface and other auxiliary mechanisms internally besides of the side airbag unit 92.

After the side airbag unit 92 and other auxiliary mechanisms are assembled in the vehicle seat 91, the seat cover 94a is put on the seat back portion and the slider of the slide fastener 1 is slid so as to close the seat cover 94a. A concealed slide fastener having coupling teeth row on its rear face can be used as the slide fastener 1 so as to improve the appearance of the seat back 94. Even without using the concealed slide fastener, the coupling teeth rows can be concealed from outside by arranging a flap on the surface of the slide fastener 1.

When a passenger is seated on the vehicle seat 91, the seat back 94 sags in the middle by the weight of the passenger. Accordingly, a lateral pulling force is applied to the slide fastener 1 covering the side portion of the seat back 94. The slide fastener 1 needs to be capable of withstanding the lateral pulling force applied in usual use. On the other hand, when a vehicle collides, the slide fastener 1 needs to cleave so that the airbag expands.

The slide fastener 1 of the present invention has a coupling head and attaching leg portion of devised shapes so as to be capable of sufficiently withstanding a lateral pulling force of less than 40 N/cm, which is usually applied (hereinafter referred to as usual lateral pulling force), and capable of allowing the airbag to be inflated out within 20/1000 seconds if a lateral pulling force of 40 N/cm or more, preferably 60-250 N/cm, which is applied when cleaved (hereinafter referred to as cleavage lateral pulling force), is applied.

If coupling is released at a part of the slide fastener 1 during the inflation of the airbag, the coupling of the coupling teeth row is released sequentially toward the end of the slide fastener as the airbag is inflated. Accordingly, the airbag can be inflated out from thus cloven part of the slide fastener 1 in a short time so as to largely cushion a shock to be applied to the human body upon collision, thereby securing the safety of passengers.

Figure 2:
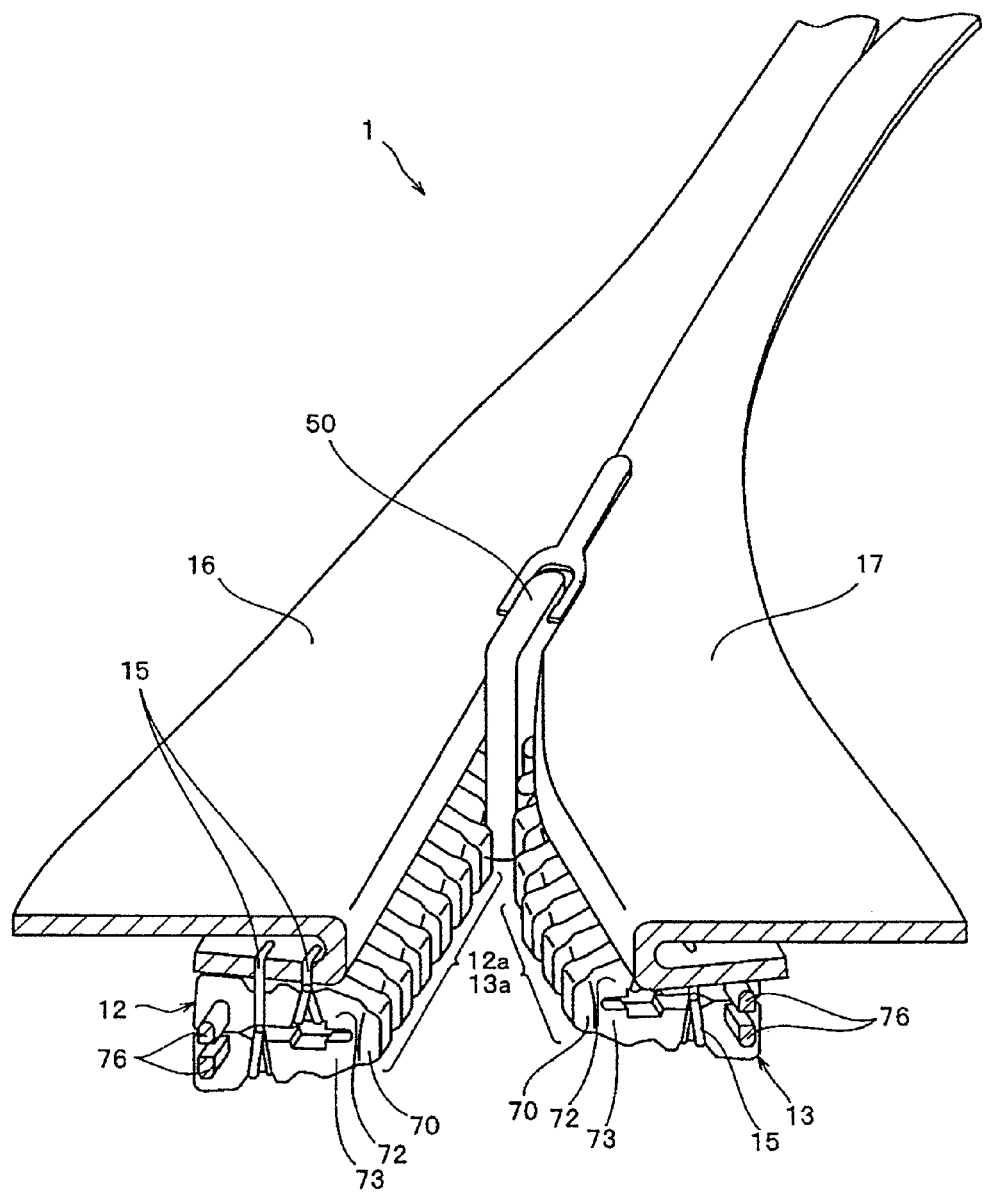
FIG. 2 is an appearance view of the slide fastener of the present invention showing a section taken along an orthogonal to the coupling axis of the slide fastener.
Figure 3:
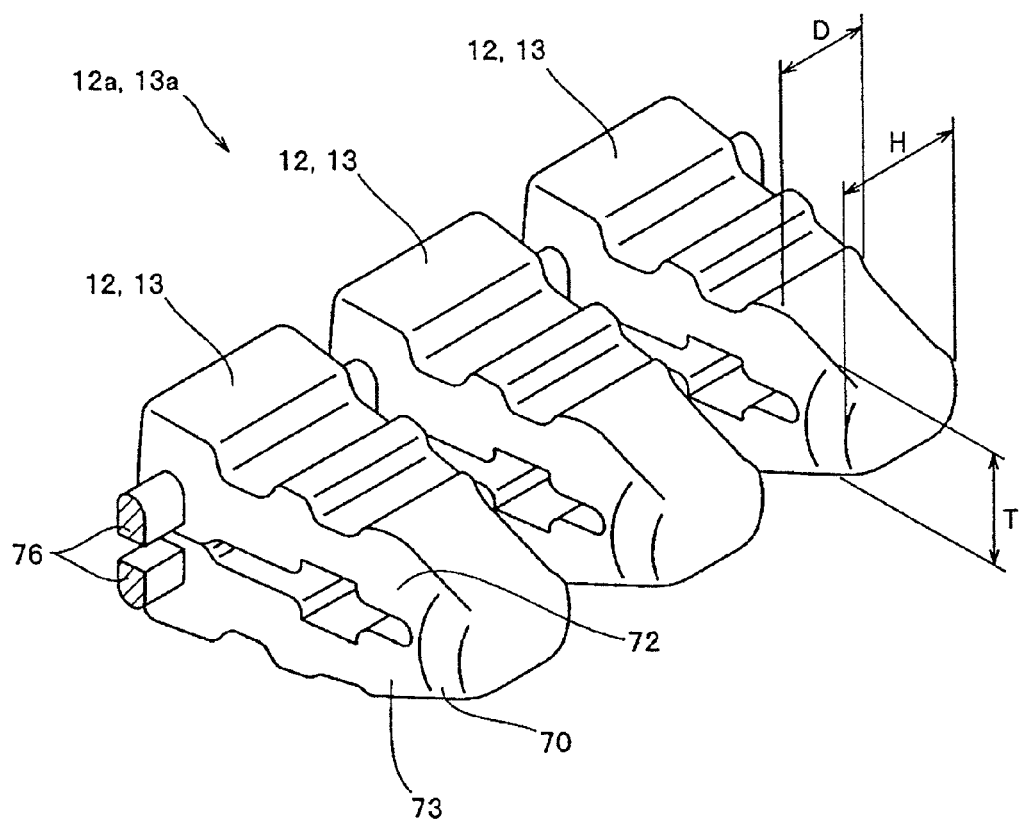
FIG. 3 is an enlarged view of a left coupling teeth row of the slide fastener shown in FIG. 2.

FIG. 2 is an appearance view of the slide fastener 1 of the present invention showing a section taken along an orthogonal line to the coupling axis of the slide fastener 1 to illustrate a shape of a coupling tooth. FIG. 3 is a view for illustrating a left coupling teeth row 12a and a right coupling teeth row 13a of the slide fastener 1 shown in FIG. 2 in enlargement.

As shown in FIGS. 2 and 3, the slide fastener 1 includes: a left fastener tape 16 and a right fastener tape 17; the left coupling teeth row 12a and the right coupling teeth row 13a disposed along opposing coupling tooth attaching portions of the left fastener tape 16 and right fastener tape 17; and a slider 50 which couples or decouples the left coupling teeth row 12a and the right coupling teeth row 13a when moved up and down with the left coupling teeth row 12a and the right coupling teeth row 13a passing therethrough.

The coupling tooth attaching portions of the slide fastener 1 shown in FIG. 2 are turned back to their rear sides to form U-shapes. The left coupling teeth row 12a and the right coupling teeth row 13a turned back to form U-shapes are sewed on the coupling tooth attaching portions of the left fastener tape 16 and the right fastener tape 17 with the sewing thread 15.

Although the slide fastener 1 shown in FIG. 2 is a concealed slide fastener capable of being concealed, the slide fastener of the present invention is not limited to the concealed slide fastener. Although the left coupling teeth composed of the left coupling teeth row 12a and the right coupling teeth composed of the right coupling teeth row 13a of the slide fastener 1 shown in FIG. 2 are coupling teeth formed by injection molding, the coupling tooth of the present invention are not limited to the coupling tooth formed by injection molding and zigzag-shape mono-filament coupling teeth row (see FIGS. 12, 16 to be described later) or the coil-shape mono-filament coupling teeth row (see FIG. 17 to be described later) can be used.

As shown in FIG. 2, each of the left coupling teeth 12 and right coupling teeth 13 respectively composed of the left coupling teeth row 12a and right coupling teeth row 13a have coupling heads 70 for coupling both the right and left coupling teeth and a first leg 72 and a second leg 73 extending branched to two directions toward the front and the rear from the coupling head 70.

Figure 4:
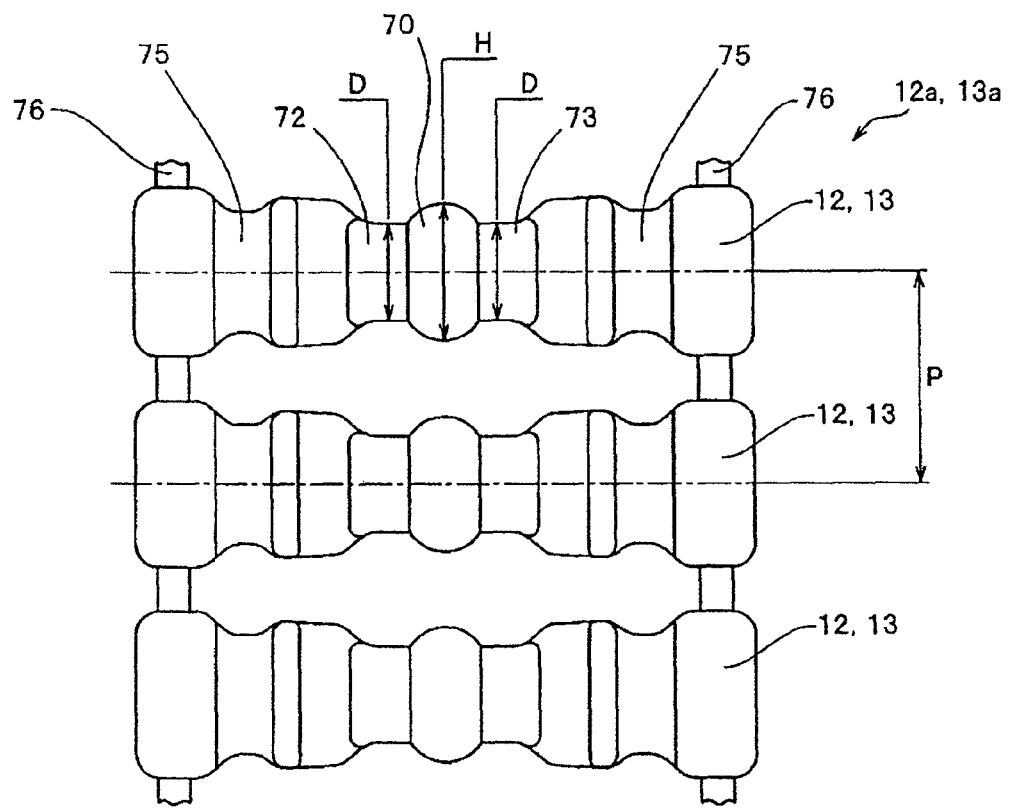
FIG. 4 is a plan view showing a state just after the left coupling teeth row is formed.

Connecting threads 76 are passed through the first leg portion 72 and second leg portion 73 at their end portions (proximal portions) for connecting the left coupling teeth 12 and right coupling teeth 13 with intervals (pitches) set equally to form the left coupling teeth row 12a and the right coupling teeth row 13a. The connecting thread 76 is formed integrally by insert molding as shown in FIG. 4 to be described later, when the left coupling teeth row 12a and the right coupling teeth row 13a are molded.

The slide fastener 1 of the present invention has the coupling head 70, and the first leg 72 and the second leg 73 in the vicinity of the coupling head 70, all of which are of devised shapes so as to be capable of sufficiently withstanding a usual lateral pulling force (a force for pulling in the left-right direction in FIG. 2) of less than 40 N/cm, which is usually applied, and capable of allowing the airbag to be inflated out in a short time if a cleavage lateral pulling force of 40 N/cm or more is applied. The shapes of the coupling head 70 and neighboring portions will be respectively defined using FIG. 3.

The coupling head 70 of each of the left coupling tooth 12 and the right coupling tooth 13 of the slide fastener 1 of the present invention is formed to have a summit height H mm as shown in FIG. 3. A portion, in which the coupling head 70 enters when the right and left coupling teeth are coupled, and which is in the vicinity of the coupling head 70 of the first leg portion 72 and the second leg portion 73, is formed to have a neck width D mm smaller than the coupling head 70. In the slide fastener 1 of the present invention, a difference between the summit height H and the neck width D of the coupling head 70 of each of the left coupling teeth and right coupling teeth is set relatively smaller than a typically used slide fastener. The coupling tooth thickness T mm of the coupling head 70 shown in FIG. 3 is set relatively short appropriately to reduce the lateral pulling strength.

This coupling tooth thickness T may be defined as an engaging thickness between the left coupling tooth 12 and the right coupling tooth 13.

FIG. 4 is a plan view showing a state just after the left coupling teeth row 12a and right coupling teeth row 13a are formed for illustrating the summit height H and the neck width D of the coupling head 70 explained with reference to FIG. 3.

Each of the left coupling teeth row 12a and the right coupling teeth row 13a just after molded has the first leg portion 72, the coupling head 70 and the second leg portion 73 formed symmetrically in line, as shown in FIG. 4. The first leg portion 72 and the second leg portion 73 are connected at their end portions using the connecting thread 76 so that the intervals between the left coupling teeth 12 and the right coupling teeth 13 have a predetermined interval (pitch P) necessary for coupling both of them. Although the neck width D of the coupling tooth formed by injection molding is as shown in FIGS. 3 and 4, the neck width D is defined to be a diameter of the mono-filament if coupling teeth made of coil-shape or zigzag-shape mono-filament are used.

Figure 5:
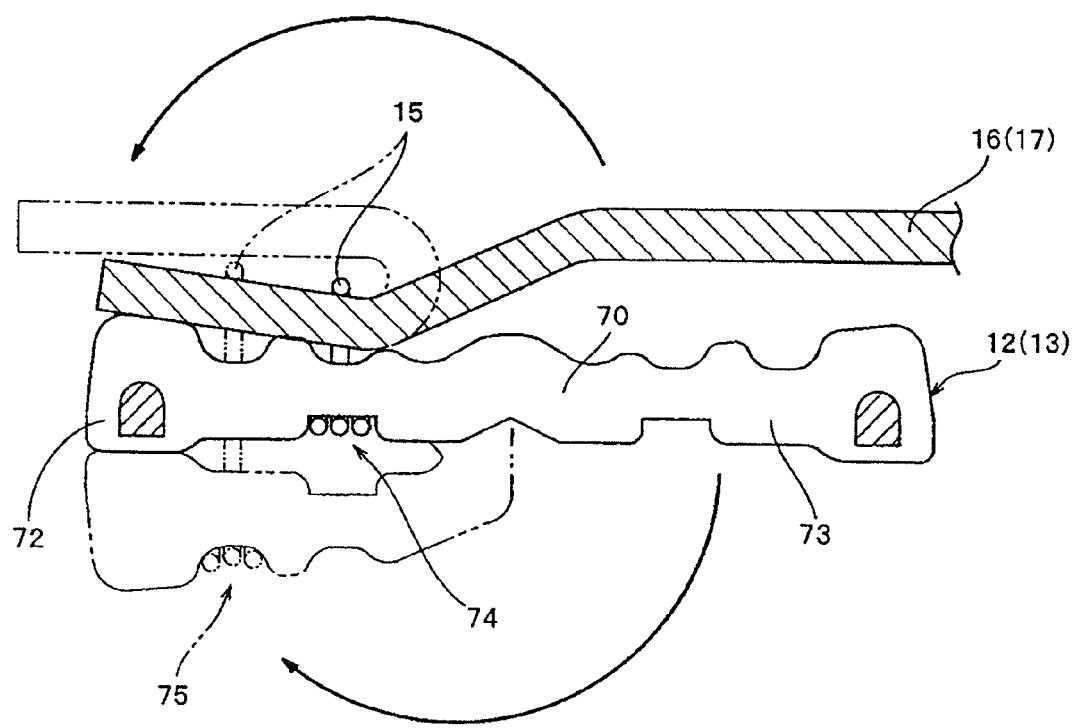
FIG. 5 is a view showing a step for sewing the formed left coupling teeth row on the left fastener tape.

Next, a state in which the molded left coupling teeth row 12a is sewed on the left fastener tape 16 will be described referring to a FIG. 5. Here, a state in which the right coupling teeth row 13a is sewed on the right fastener tape 17 is the same as the state shown in FIG. 5 and thus, description thereof will not be made.

The left coupling tooth 12 after molded as shown in FIG. 4 is disposed at a coupling tooth attaching portion of the right fastener tape and sewed with the sewing thread 15 around a sewing portion 74 of the first leg portion 72. After that, the second leg portion 73 is rotated clockwise about the central portion of the coupling head 70 from the state shown in FIG. 5 to overlap with the first leg portion 72 from below.

Next, the left coupling tooth 12 is sewed on the left fastener tape 16 with the sewing thread 15 around the sewing portion 75 and end treatment is performed at both ends of the left coupling tooth 12. Finally, the coupling tooth attaching portion of the left fastener tape 16 is rotated counterclockwise into a U-shape so that the coupling head 70 of the left coupling tooth 12 is projected outward from the coupling tooth attaching portion. In the meantime, the right coupling tooth 13 is formed and sewed on the right fastener tape 17 in the same way so as to complete the right and left fastener stringers.

Figure 6:
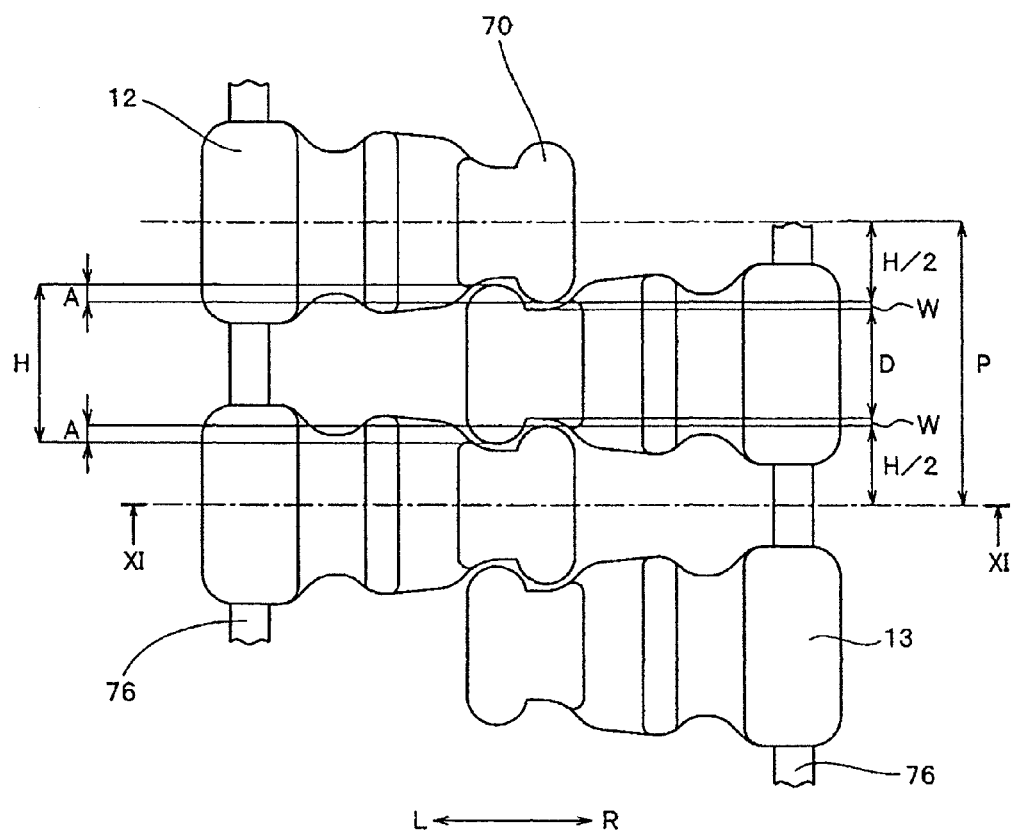
FIG. 6 is a plan view of coupling teeth rows showing a state in which the left coupling tooth and the right coupling tooth are coupled with each other by pulling up the slider.

FIG. 6 is a plan view of a coupling teeth row in a state where the left coupling tooth 12 and the right coupling tooth 13 are coupled with each other by pulling up the slider 50.

When the left coupling tooth 12 and the right coupling tooth 13 are coupled as shown in FIG. 6, the coupling head 70 having the summit height H of each of the left coupling tooth and the right coupling tooth 13 enters into a gap between the leg portions having the neck width D of the opposing right coupling tooth 13 or the left coupling tooth 12. Here, when the left coupling tooth 12 and the right coupling tooth 13 are coupled, the gap generated between the summit height H and the neck width D is defined as a coupling gap W [mm] and the dimension of a portion in which the coupling heads 70 overlap each other due to their coupling is defined as a coupled amount A [mm]. Further, the dimension between the respective coupling teeth of the left coupling teeth row 12a and the right coupling teeth row 13a is defined as a pitch P [mm]. Here, the coupling gap W is gap for preventing the respective coupling teeth from closely contacting to each other due to formation error of the coupling tooth, contraction rate or swelling of material, or the like.

As shown in FIG. 6, the pitch P can be expressed in a following Expression 4.

$$P = H + D + 2 \times W,$$ (Expression 4)

where:
P: pitch [mm] of left coupling tooth and right coupling tooth;
H: summit height [mm] of coupling head;
D: neck width [mm] of the portion in which the coupling head enters when right and left coupling heads are coupled, and which is in the vicinity of the coupling head of the leg portion; and
W: coupling gap [mm].

The coupled amount A as shown in the FIG. 6 can be expressed in a following Expression 5 using the above-mentioned Expression 4.

$$A = (H - D - 2 \times W)/2$$ (Expression 5)
$$= (2 \times H - P)/2,$$

where:
A: coupled amount [mm];
H: summit height [mm] of the coupling head;
D: neck width [mm] of a portion in which the coupling head enters when right and left coupling teeth are coupled, and which is in the vicinity of the coupling head of the leg portion; and
W: coupling gap [mm].

The coupled amount A indicated in the above Expression 5 is a dimension affecting the lateral pulling strength of the slide fastener 1 as shown in FIG. 6. Because the lateral pulling strength of a slide fastener is usually expressed in the strength per unit length, a coupled ratio B is defined by dividing the coupled amount A by the unit length. The coupled ratio B is expressed by a following Expression 6.

$$B = 2 \times A/P,$$ (Expression 6)

where:
B: coupled ratio between right and left coupling teeth of the slide fastener;
A: coupled amount [mm]; and
P: pitch [mm] of left coupling teeth and right coupling teeth.

The aforementioned Expression 6 can be transformed to an expression with the summit height H and pitch P by using the pitch P expressed as Expression 4 and the coupled amount A expressed as the Expression 5 to express the coupled ratio B, and thus an Expression 7 below can be obtained. The aforementioned Expression 1 can be obtained by defining the range of the coupled ratio B to 0.1 or more and 0.4 or less using a following Expression 7.

$$B = 2 \times A/P$$ (Expression 7)
$$= (2 \times H - P)/P,$$

where:
B: coupled ratio of right and left coupling teeth in slide fastener;
A: coupled amount [mm];
H: summit height [mm] of coupling head; and
P: pitch [mm] of left coupling teeth and right coupling teeth.

Figure 7:
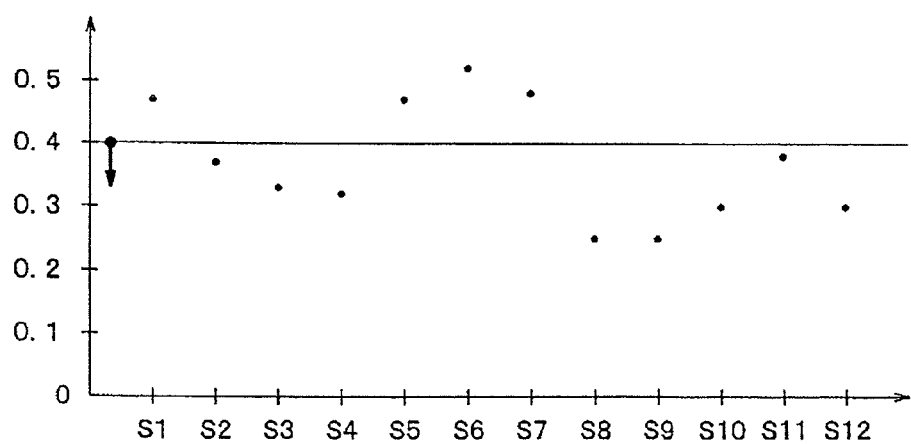
FIG. 7 is a diagram showing a result of calculation of the coupling ratio B of 12 types of the slide fasteners equipped with coupling teeth having various combination of summit height H, neck width D and pitch P and showing a range satisfying the requirement for the "cleavability by lateral pulling force".

FIG. 7 shows a result of calculation of the coupled ratio B defined in this way for plural kinds of the slide fasteners equipped with coupling teeth having various summit heights H and pitches P and shows a range satisfying requirement for the "cleavability by lateral pulling force".

Out of slide fasteners S1 to S12 shown in the FIG. 7, slide fasteners S1 to S4 and S11 are slide fasteners of a type in which successive coil-shape coupling teeth of synthetic resin are woven into a fastener tape.

The slide fasteners S5 to S7 are slide fasteners of a type in which the successive coil-shape coupling teeth of synthetic resin are sewed on the fastener tape.

The slide fastener S8 is a slide fastener of a type in which coupling teeth molded by injection molding are sewed on a fastener tape (for the shape, see FIGS. 2 to 6).

The slide fasteners S9 to S10 and S12 are slide fasteners formed by insert molding in which the coupling teeth are welded to the fastener tape at the same time as they are formed by injection molding.

Out of the slide fasteners shown in FIG. 7, the slide fasteners S8, S11 and S12 are concealable slide fasteners in each of which a turned back end is formed by turning back the coupling side of a fastener tape inwardly to form a U-shape and the coupling teeth are sewed on a coupling tooth attaching portion which is turned back so that the coupling heads of the coupling teeth are projected outward from the turned back end.

Next, an experimental result on the "cleavability by lateral pulling force" which is determined depending on whether or not the coupling of the coupling teeth is released when a cleavage lateral pulling force of 150 N/cm, which is applied at the time of inflation of the airbag, is applied to each of the slide fasteners shown in FIG. 7 will be described. A case where the "cleavability by lateral pulling force" is excellent corresponds to "a situation in which the coupling of the coupling teeth is released when the cleavage lateral pulling force is applied" and a case where the "cleavability by lateral pulling force" is inferior corresponds to "a situation in which the coupling of the coupling teeth is never released even if the cleavage lateral pulling force is applied, and thus the fastener tape is ruptured or the coupling teeth are broken".

In case where the cleavage lateral pulling force is applied to the slide fasteners S1 and S5 to S7 shown in FIG. 7, the "cleavability by lateral pulling force" is inferior because the lateral pulling strength is too strong. Thus, it can be determined that the slide fastener is not suitable for use in the airbag inflation-out opening as is.

On the other hand, in case where the cleavage lateral pulling force is applied to the slide fasteners S2 to S4 and S8 to S12 shown in FIG. 7, the coupling of the coupling teeth is released. Thus, according to FIG. 7, it can be determined that the "cleavability by lateral pulling force" necessary upon airbag inflation can be obtained when the value of the coupled ratio B is 0.4 or less. Further, the value of the coupled ratio B needs to be 0.1 or more in order to withstand a usual lateral pulling force of less than 40 N/cm applied in the usual usage. According to this experimental result, the range of the coupled ratio B in the Expression 7 is defined to 0.1 or more and 0.4 or less. Accordingly, the Expression 1 can be obtained.

To withstand the usual lateral pulling force of 40 [N/cm] or less and allow the coupling of the coupling teeth to be cloven when the cleavage lateral pulling force is applied, the summit height H of the coupling tooth and the pitch P between adjacent coupling teeth are so defined that the range of the coupled ratio B in the slide fastener is 0.1 or more and 0.4 or less.

The ranges of the summit height H mm, pitch P mm and neck width D mm suitable for the slide fastener for use on the inflation-out opening of the airbag may be $0.3 \leq H \leq 4$, $0.5 \leq P \leq 7$ and $0.2 \leq D \leq 3$.

Next, a coupled sectional amount F, which can be used as a criterion for inflating the slide fastener in a short time when the airbag is expanded, will be described using an Expression 8 below. Here, the aforementioned Expressions 2 and 3 can be obtained by defining the value of the coupled sectional amount F expressed by an Expression 8 to be 0.2 or less.

$$F = A \times T / P \quad \text{(Expression 8)}$$
$$= (2 \times H - P) \times T / (2 \times P),$$

where:
F: coupled sectional amount [mm];
A: coupled amount [mm];
T: coupling tooth thickness [mm];
P: pitch of left coupling teeth and right coupling teeth [mm], which can be approximated with T=(H−D) in case of monofilament (see FIG. 11);
H: summit height of coupling head [mm]; and
D: neck width [mm] of the portion in which the coupling head enters when right and left coupling heads are coupled, and which is in the vicinity of the coupling head of the leg portion.

It can be estimated as observing the FIG. 6 that reduction of the coupled amount A is effective in order to quickly release the coupling teeth coupled in the slide fastener in which the coupling teeth are coupled with each other. An actual experiment result on the "quick expansion property" of the slide fasteners having a various coupling tooth shapes actually coincides with an empirical value satisfying that a product having smaller coupled amount A is more excellent in "quick expansion property". Therefore, it can be assumed that the "quick expansion property" of the slide fastener drops in proportion to the coupled amount A (see the aforementioned Expression 8).

Empirically, it can be estimated that the larger the thickness of the coupling tooth at the coupling head of the slide fastener (for the position of the coupling tooth thickness T, see FIG. 3) is, the more difficult it becomes to quickly release the coupling teeth coupled sequentially. In an actual slide fastener, it can be observed that a coupling tooth having a larger coupling tooth thickness T is likely to be more inferior in "quick expansion property" than a coupling tooth having a smaller coupling tooth thickness T. Consequently, it can be assumed that the "quick expansion property" of the slide fastener is dropped in proportion to the coupling tooth thickness T (see the aforementioned Expression 8).

Also it can be estimated that the quick expansion property is inferior if the number of the coupling teeth per a predetermined length is large because the shape of the coupling tooth is small. Thus, it can be assumed that the quick expansion property is likely to be lowered in inverse proportion to the value of the pitch P of the coupling teeth shown in FIG. 4 (see the aforementioned Expression 8).

Figure 8:
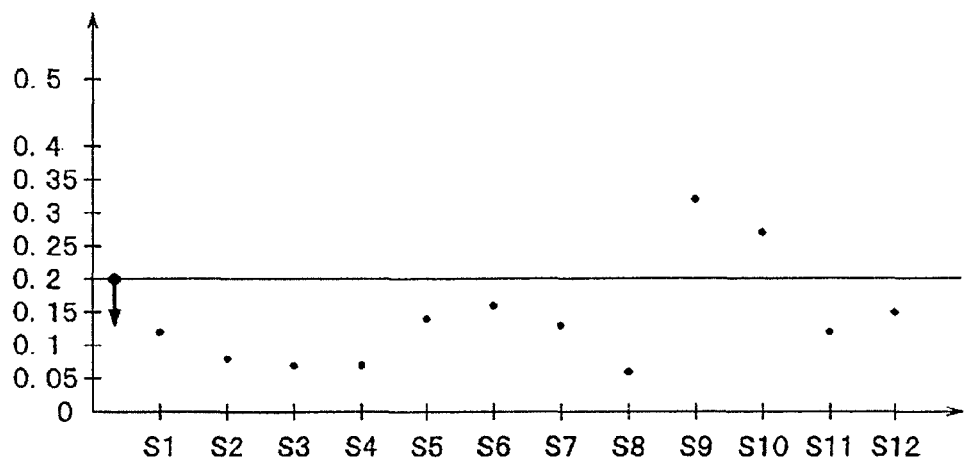
FIG. 8 is a diagram showing a result of calculation of a coupled section amount F of 12 types of the slide fasteners shown in FIG. 7 and showing a range satisfying the requirement for the "quick expansion property".

FIG. 8 shows a result of calculation of the coupled sectional amount F defined in the above way for the samples of the respective slide fasteners shown in FIG. 7 and shows the range satisfying requirement for the "quick expansion property". Referring to FIG. 8, an experiment result on the "quick expansion property" which is determined depending on whether or not the airbag is inflated within 20/1000 seconds when a cleavage lateral pulling force of 150 N/cm, which is applied at the time of inflation of the airbag, is applied to each of the slide fasteners having lengths 30 cm will be described below.

Out of the respective slide fasteners shown in FIG. 8, the slide fasteners of S9 and S10 are inferior in "quick expansion property" and other slide fasteners are excellent in "quick expansion property". Considering the coupled sectional amount F and the result of the experiment on the "quick expansion property" shown in FIG. 8, it is considered that the value of the coupled sectional amount F satisfying the requirement for the "quick expansion property" is preferred to be 0.2 or less when the slide fastener is used on the inflation-out opening of the airbag. The Expression 2 and Expression 3 can be obtained by requiring the range of the coupled sectional amount F in the Expression 8 to be 0.2 or less according to this result of the experiment. That is, the coupling tooth thickness T, the pitch P of the coupling teeth and the summit height H of the coupling head are preferably determined in such a manner that the value of the coupled sectional amount F is 0.2 or less.

In the slide fastener S8, which uses coupling teeth formed by injection molding, out of the slide fasteners shown in FIGS. 7 and 8, the coupling of the coupling teeth are released when a predetermined cleavage lateral pulling force is applied and the coupling teeth are opened quickly starting from the cleavage starting point where the coupling teeth have been released. If the sliding fastener S8 is used on the inflation-out opening of the airbag, the coupling teeth are cloven when a cleavage lateral force of 150 N/cm is applied to the slide fastener and then, the slide fastener is opened within 20/1000 seconds so as to secure an opening to allow the airbag to inflate. Here, the range of the coupling tooth thickness T [mm] suitable for a slide fastener for use in the inflation-out opening for the airbag can be defined as a range of $0.5 \leq T \leq 5$.

Next, the appearance of the sliding fastener S12 shown in FIGS. 7 and 8 will be explained with reference to FIGS. 9 and 10.

Figure 9:
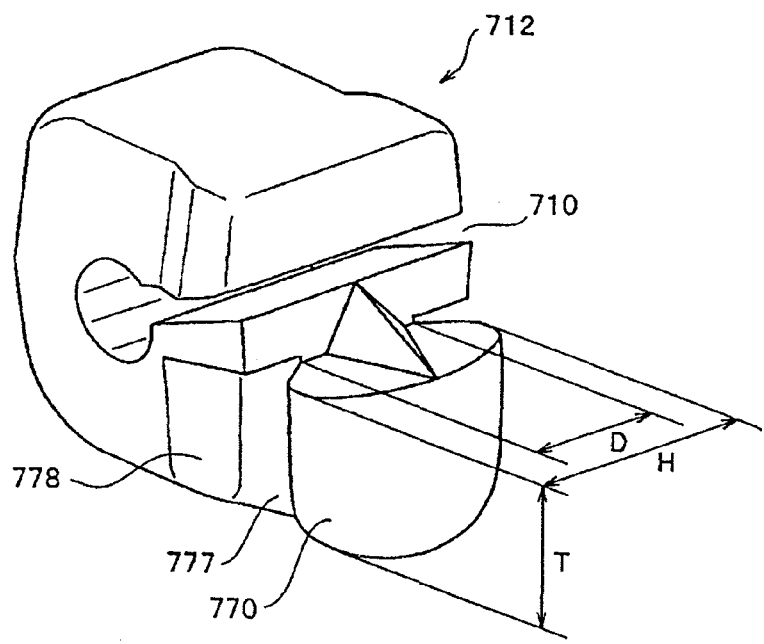
FIG. 9 is a perspective view of the appearance of the coupling tooth for a concealed slide fastener formed by injection molding.

FIG. 9 is a perspective view of a coupling tooth 712 for a concealed slide fastener formed by injection molding. FIG. 10 is a lateral sectional view showing a state in which the coupling tooth 712 shown in FIG. 9 is fixed to a fastener tape 716.

Figure 10:
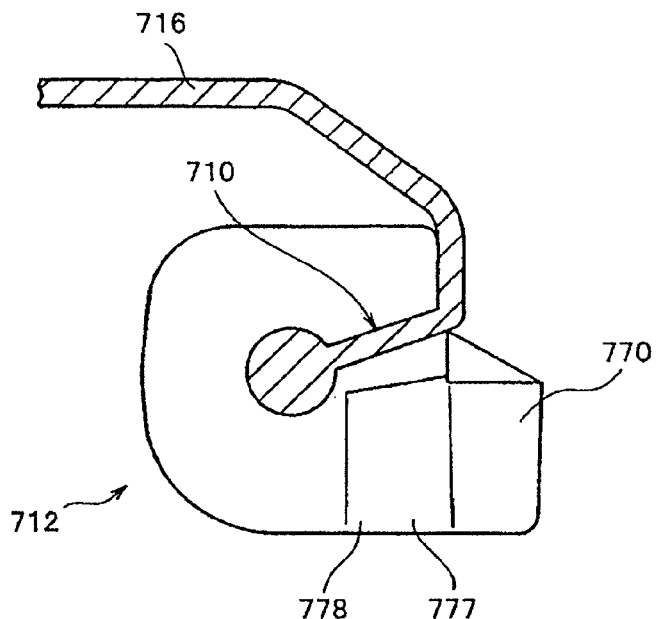
FIG. 10 is a lateral sectional view showing a state in which the coupling teeth for the slide fastener shown in FIG. 9 are fixed to the fastener tape.

As shown in FIGS. 9 and 10, the lateral section of the coupling tooth 712 has a substantially C shape and forms a nipping groove 710 (leg portion) for nipping the side edge of the fastener tape 716 with its central portion toward the coupling portion. The fastener tape 716 nipped in the nipping groove 710 projects toward the coupling portion from the nipping groove 710 and then is turned back into U-shape. Thus, only a coupling head 770 is projected from the end portion of the turned back fastener tape 716. The fastener tapes 716 in this state and symmetrical to each other are coupled with each other. Accordingly, the coupling teeth 712 are not seen from the front surface (from above in the embodiment shown in FIG. 10) of the slide fastener, thereby improving the appearance of the slide fastener. In the meantime, the airbag unit is disposed behind the slide fastener (below in the embodiment shown in FIG. 10).

Positions of the summit height H and coupling tooth thickness T of the coupling head 770 formed to have large width on the coupling tooth 712 are as shown in FIG. 9. A constricted neck portion 777 is formed between the coupling head 770 of the coupling tooth 712 and a shoulder portion 778 in order to receive the coupling head 770 of the coupling tooth 712 fixed to the fastener tape 716 on an opposite side. The width of the most constricted portion of this neck portion 777 is defined as a neck width D.

If the slide fastener equipped with the coupling teeth 712 shown in FIGS. 9 and 10 is used for the inflation-out opening for the airbag, the summit height H and pitch P are so determined that the range of the coupled ratio B expressed by the Expression 7 is 0.1 or more and 0.4 or less in order to satisfy the requirement for the "cleavability by lateral pulling force". Further, the coupling tooth thickness T, the pitch P of the coupling tooth, and the summit height H of the coupling head are determined so that the range of the coupled sectional amount F is 0.2 or less so as to satisfy the requirement for the "quick expansion property".

Next, the positions of the summit height H and the neck width D of the coupling tooth and the coupling tooth thickness T in case of using a coil-shape or zigzag-shape mono-filament as the coupling tooth for the slide fastener will be described with reference to FIGS. 11 to 13.

Figure 11:
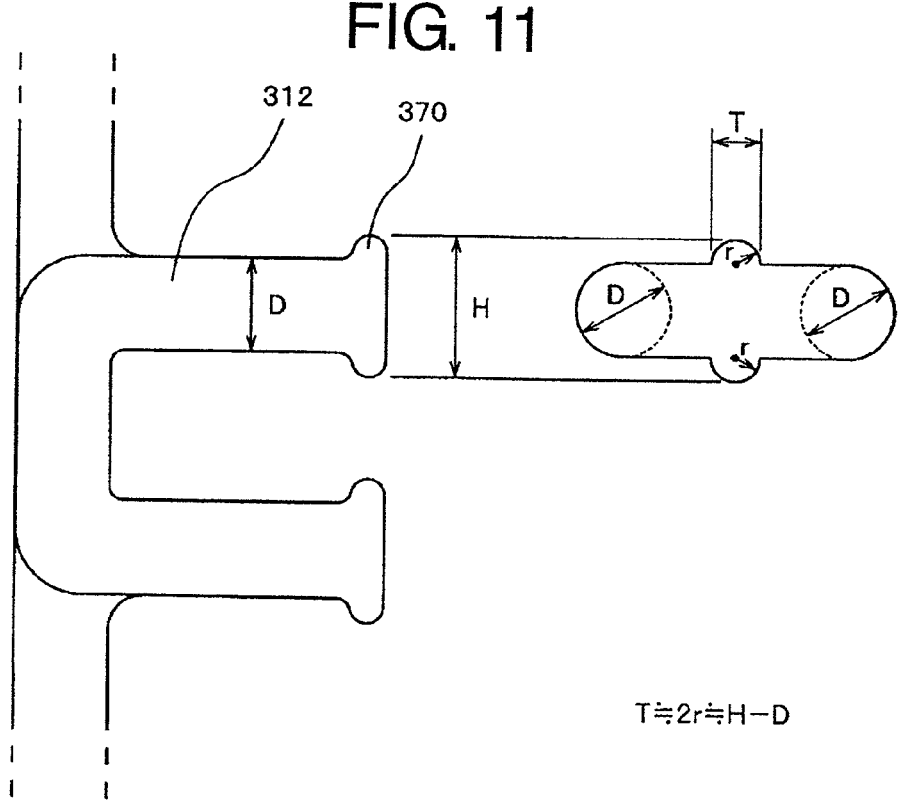
FIG. 11 is view for defining the position of a coupling tooth thickness T of the coupling tooth made of mono-filament while its left diagram is a plan view of the slide fastener when viewed from the front side and its right diagram is a right side view corresponding to the plan view.

The left view of FIG. 11 is a plan view of the coupling tooth 312 made of a mono-filament as seen from the front side and the right view thereof is a right side view corresponding to the plan view. FIG. 12 is a perspective view of the single coupling tooth 312 made of mono-filament.

Figure 12:
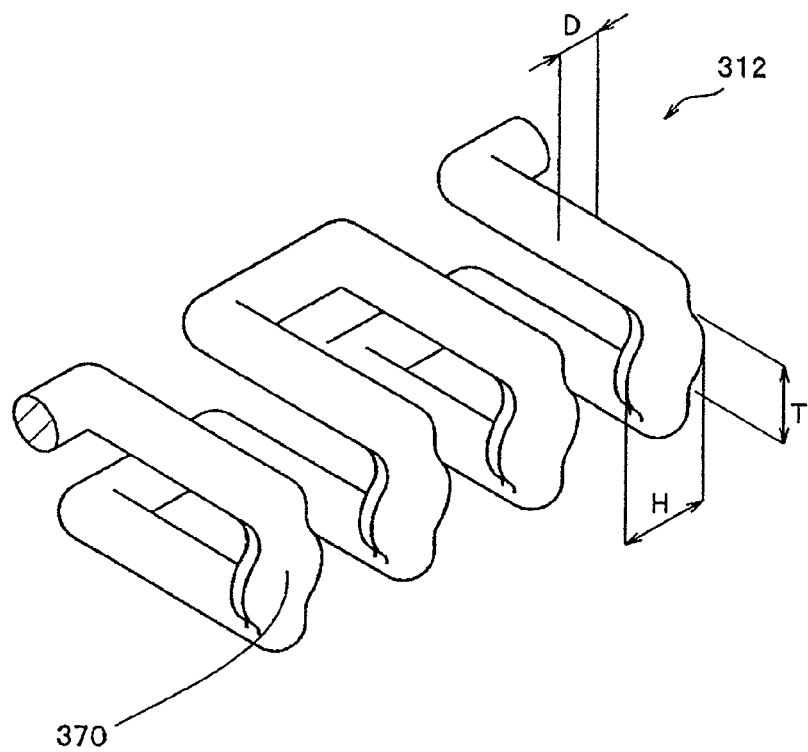
FIG. 12 is a perspective view for defining the positions of the coupling tooth thickness T and the neck width D of the coupling tooth made of zigzag-shape mono-filament.

As shown in the right view of FIG. 11 and FIG. 12, the coupling tooth thickness T of the coupling tooth 312 made of the zigzag-shape mono-filament is the length of the proximal portion of a portion of the summit height H of the coupling head 370 projecting from the neck width D (value corresponding to the diameter of the mono-filament leg portion). Here, because it can be recognized empirically that the side shape of the projecting portion is a semi-circle having a radius r, the coupling tooth thickness can be expressed as $T \approx 2 \times r \approx H-D$. The coupling tooth made of mono-filament shown in FIGS. 11 and 12 is the zigzag-shape coupling tooth, however the dimension of the coupling tooth thickness T can be defined for the coil-shape coupling tooth. The aforementioned Expression 3 (Expression 3) expresses the coupled sectional amount F with approximation of coupling tooth thickness $T=(H-D)$.

Next, the positions of the neck width D of the coupling tooth made of coil-shape mono-filament and the coupling tooth thickness T will be described with reference to FIG. 13. FIG. 13 is a view showing a state in which the coil-shape coupling tooth 812 is sewed on the coupling tooth attaching portion of the fastener tape 816 and is a sectional view taken along an orthogonal line to the coupling axis of the slide fastener. The position of the summit height H of the coupling tooth made of the coil-shape mono-filament is the same as the position of the summit height H of the coupling tooth 312 made of the zigzag-shape mono-filament shown in FIG. 12 and thus description thereof is not repeated.

Figure 13:
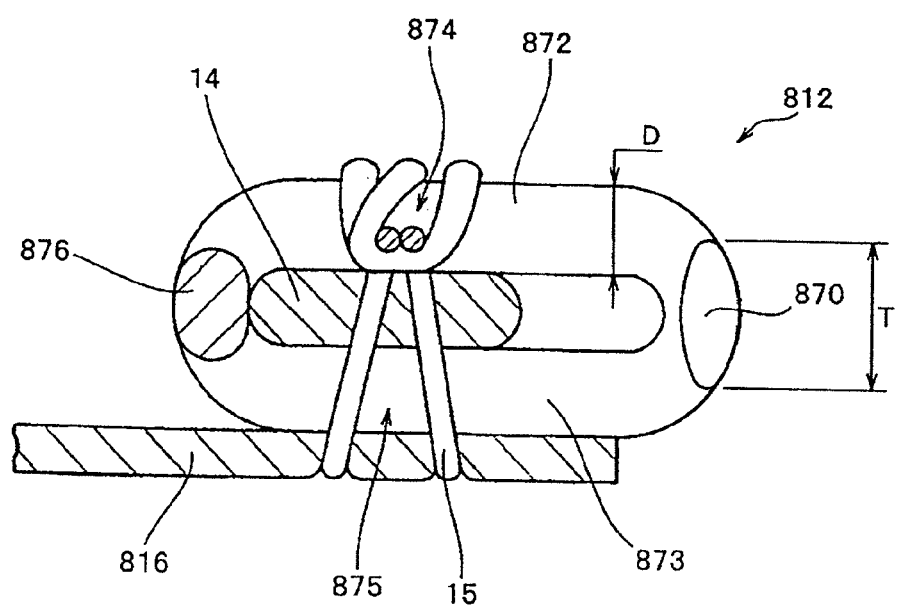
FIG. 13 is a sectional view for defining the positions of the coupling tooth thickness T and the neck width D of the coupling tooth made of coil-shape mono-filament.

As shown in FIG. 13, the coupling tooth thickness T of a coupling tooth 812 made of the coil-shape mono-filament is the length of the proximal portion of a portion projecting with a summit height H in a direction to both adjacent coupling teeth (other coupling teeth existing in the front and rear of FIG. 13) in a coupling head 870 from which a first leg portion 872 and second leg portion 873 having a neck width D extends branched to two directions. By determining the summit height H and pitch P to satisfy the requirement expressed in the aforementioned Expression 1 in the coupling tooth made of the mono-filament shown in FIGS. 11 to 13, there can be provided a slide fastener capable of withstanding a usual lateral pulling force and capable of being cloven if a cleavage lateral pulling force of 40 N/cm or more is applied.

Further, the summit height H and pitch P of the coupling teeth, coupling tooth thickness T or neck width D can be defined to satisfy the requirement expressed in the aforementioned Expressions 2 and 3 so as to improve the quick expansion property after the coupling of part of the slider fastener is released.

Next, the structure after the coupling teeth 812 made of mono-filament are sewed on the fastener tape 816 will be described with reference to FIG. 13. The structure after the coupling teeth 312 made of the zigzag-shape mono-filament shown in FIGS. 11 and 12 is sewed also has the same structure. The coupling head 870 is formed on one side edge of the coil-shape coupling tooth 812 as shown in FIG. 13. The first leg portion 872 and second leg portion 873 extend branched from both ends of the coupling head 870.

To sew the coil-shape coupling teeth 812 on the fastener tape 816, the core thread 14 is passed through the central portions of the coil-shape coupling teeth 812 communicating with each other and the coupling teeth 812 are sewed with the sewing thread 15 around a sewing portion 874 of the first leg portion 872. At this time, a sewing portion 875 of the second leg portion 873 is nipped in the first leg portion 872 closer to the fastener tape 816, the sewing thread 15 is placed around only the first leg portion 872, the sewing portion 875 of the second leg portion 873 is pressure bonded to the fastener tape 816 having the core thread 14 in between, and then the first leg portion 872 and the second leg portion 873 are sewed on the fastener tape 816. The first leg portion 872 and second leg portion 873 of each coupling tooth 812 are connected to the second leg portion 873 and first leg portion 872 of a coupling tooth, which are adjacent with a turned back connecting portion 876 in between.

Next, an embodiment of the slide fastener capable of reducing inconvenience in the case of an coupling tooth is cracked due to an excessive lateral force applied to the slide fastener, such that a broken piece of the cracked coupling tooth is separated from the fastener tape, will be described with reference to FIGS. 14 to 17.

Figure 14:
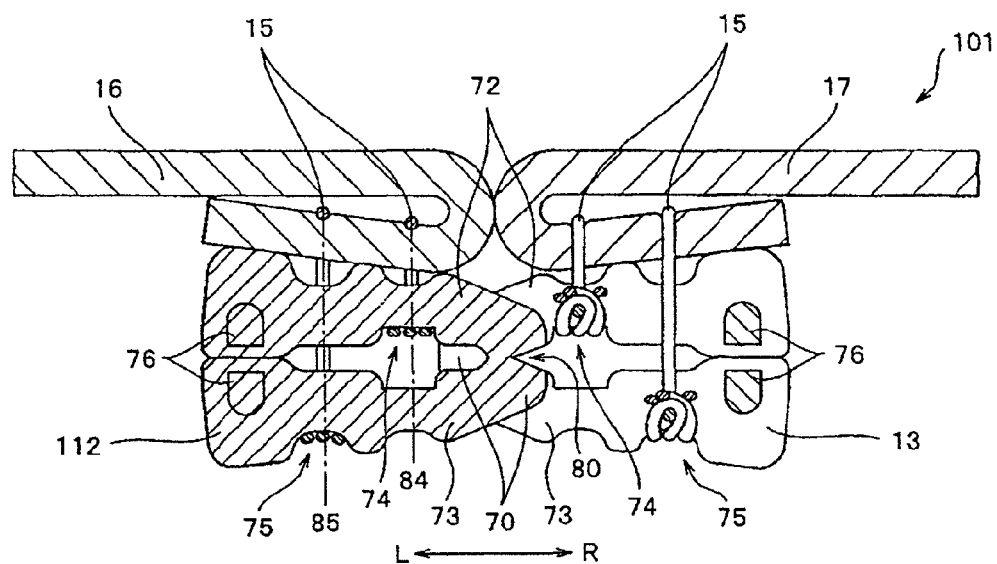
FIG. 14 is a view showing an embodiment in which a brittle portion having reduced rapture strength is formed in a coupling head.

FIG. 14 is a sectional view of the slide fastener 101 with its left coupling tooth 112 and right coupling tooth 13 are coupled, taken along an orthogonal line to the coupling axis of the slide fastener 101 and a sectional view corresponding to the sectional view taken along the line XI-XI of FIG. 6.

As shown in FIG. 14, the slide fastener 101 includes the left fastener tape 16, the right fastener tape 17 and the left coupling teeth 112 and right coupling teeth 13 disposed along opposing coupling tooth attaching portions of the left fastener tape 16 and right fastener tape 17.

The coupling tooth attaching portion of the slide fastener 101 shown in FIG. 14 is turned back to its rear side to form U-shape and the left coupling tooth 112 and the right coupling tooth 13 are sewed on the coupling tooth attaching portions of the left fastener tape 16 and the right fastener tape 17 turned back into the U-shape with the sewing thread 15. Although the slide fastener 101 shown in FIG. 14 is a concealed slide fastener capable of being concealed, the slide fastener of the present invention is not limited only to the concealed slide fastener.

As shown in FIG. 14, each of the left coupling tooth 112 and the right coupling tooth 13 includes a coupling head 70 for coupling both the right and left coupling teeth and the first leg portion 72 and second leg portion 73 which extend branched from the coupling head 70. The brittle portion 80, which has a notched shape to reduce the sectional area of the coupling head 70, is formed in the center of the coupling head 70 of the left coupling tooth 112. The brittle portion 80 may be formed in only the coupling head 70 of either one of the left coupling tooth 112 and the right coupling tooth 13 or may be formed in the coupling heads 70 of both the left coupling tooth 112 and right coupling tooth 13. Although according to the embodiment shown in FIG. 14, the brittle portion 80 is formed by notching the coupling head 70 into a V-shape from outside, the brittle portion may be formed by notching the coupling head 70 from inside.

The sewing portion 74 (concave groove) on which the sewing thread 15 to sew on the left fastener tape 16 or the right fastener tape 17 is placed is previously formed on a portion of the first leg portion 72 extending from the coupling head 70 between its end portion and the coupling head 70 and the portion being on a closer side to the second leg portion 73. Further, the sewing portion 75 (concave groove) on which the sewing thread 15 is placed is previously formed on a portion of the second leg portion 73 between its end of and the coupling head 70 and the portion being on the outer peripheral side. The sewing portion 74 and sewing portion 75 are not limited to the concave grooves previously formed on the first leg portion 72 and second leg portion 73. For example, the sewing portion mentioned here includes a sewing portion in a case using sequential coupling tooth made of synthetic resin mono-filament, the sewing portion formed on the leg portion distorted due to sewing after sewing with the sewing thread 15.

As shown in FIG. 14, an orthogonal line to the left fastener tape 16 in the portion, on which the sewing thread 15 is placed, of the sewing portion 74 of the first leg portion 72 is defined as a sewing line 84. Further, an orthogonal line to the left fastener tape 16 in a portion, on which the sewing thread 15 is placed, of the sewing portion 75 of the second leg portion 73 is defined as a sewing line 85. The brittle portion 80 having reduced rupture strength is formed at a position in an area from the sewing line 84 of the first leg portion 72 to the sewing line 85 of the second leg portion 73 over the coupling head 70.

The connecting thread 76 for connecting respective coupling teeth with setting intervals between the coupling teeth equally is passed through the first leg portion 72 and the second leg portion 73 at their end portions (proximal portions) at the time of forming the left coupling tooth 112 and the right coupling 13. The connecting thread 76 is formed integrally by insert molding as shown in FIG. 14 at the time of forming the left coupling tooth 112 and the right coupling tooth 13.

Figure 15:
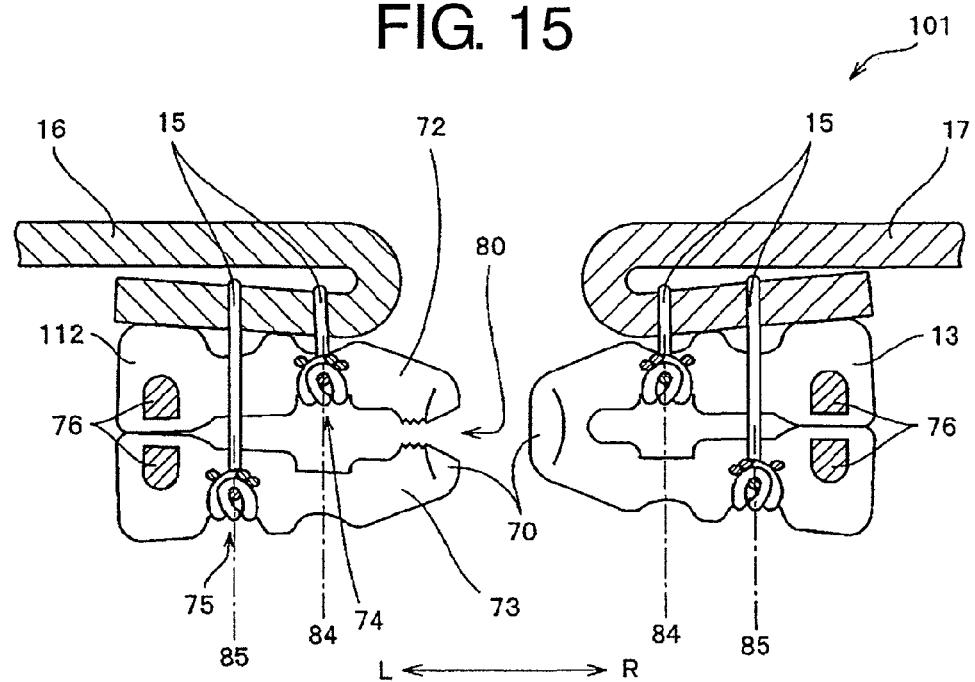
FIG. 15 is a view showing a state in which the left coupling tooth is broken at the brittle portion when a cleavage lateral pulling force is applied to the slide fastener shown in FIG. 14.

Next, FIG. 15 shows a state in which an excessive lateral pulling force is applied to the left coupling tooth 112 and the right coupling tooth 13 coupled as shown in FIG. 14 causing the left coupling tooth 112 and the right coupling tooth 13 to be cloven in the right and left direction (L-R direction shown in FIG. 14) and at that time the left coupling tooth 112 is broken at the brittle portion 80.

In the slide fastener 101 shown in FIG. 14, the a difference between the summit height H and the neck width D of the coupling head 70 of the left coupling tooth 112 and the right coupling tooth 13 is set relatively small so that the coupled ratio B is set to 0.4 or less. Therefore, lateral pulling force of 40 N/cm or more is not applied to the slide fastener 101 because the slide fastener 101 is cloven. However, in the case where the lateral pulling force is applied while the slide fastener is twisted for some reason or a push-up force and the lateral pulling force are applied to the right and left fastener stringers of the slide fastener 101 at the same time, the coupling teeth coupled may be broken.

Because the brittle portion 80 having a rupture strength reduced by notching into a V-shape is formed at a position in an area from the sewing line 84 in the sewing portion 74 of the left coupling tooth 112 to the sewing line 85 in the sewing portion 75 over the coupling head 70 as shown in FIGS. 14 and 15, a rupture occurs in this brittle portion 80 when the coupling tooth is broken by the lateral pulling force. Even if the left coupling tooth 112 is broken at the brittle portion 80, an inconvenience that the broken piece of the first leg portion 72 is separated from the left fastener tape 16 can be reduced because the broken piece on the first leg portion 72 side is sewed on the left fastener tape 16 in the sewing portion 74 and the slide fastener can be opened more quickly due to the rupture.

Further, in the embodiment shown in FIGS. 14 and 15, the first leg portion 72 is connected to the adjacent other left coupling tooth 112 at their end portion with the connecting thread 76, an inconvenience that the first leg portion 72 is separated from the left fastener tape 16 when the sewing thread 15 is broken by a strong lateral pulling force can be reduced.

On the other hand, because the broken piece of the second leg portion 73 side is sewed on the left fastener tape 16 in the sewing portion 75, an inconvenience that the broken piece of the second leg portion 73 is separated from the left fastener tape 16 can be reduced. Likewise because the second leg portion 73 is connected to the adjacent other left coupling tooth 112 at their end portion with the connecting thread 76, an inconvenience that the second leg portion 73 is separated from the left fastener tape 16 when the sewing thread 15 is broken can be reduced.

Although as the embodiment shown in FIGS. 14 and 15, a structure in which the brittle portion 80 is formed in only the coupling head 70 of the left coupling tooth 112 while no brittle portion 80 is formed in the coupling head 70 of the right coupling tooth 13 is shown, the brittle portion 80 may be formed in both the coupling heads 70 of the left coupling tooth and right coupling tooth of the slide fastener. The shape of the brittle portion 80 is not limited to the V-shaped groove and the brittle portion 80 may be formed by forming an opening in part of the coupling head or leg portion of the coupling tooth and forming the brittle portion whose sectional area is smaller than the other portions on both sides of the opening.

Figure 16:
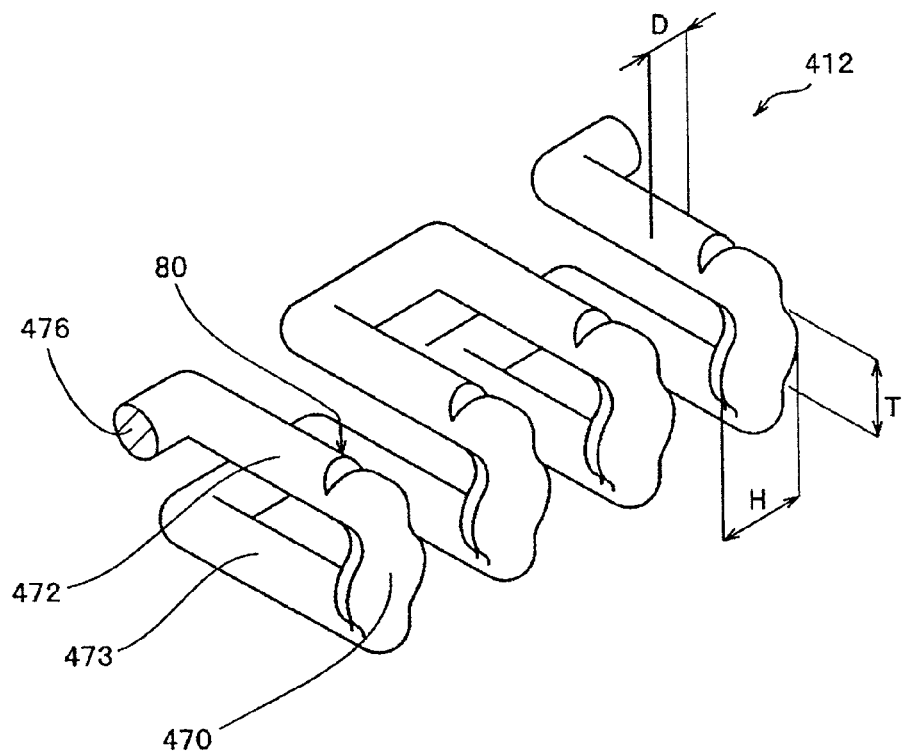
FIG. 16 is a view showing an embodiment in which the brittle portion having a reduced rupture strength is formed in part of the zigzag-shape coupling tooth.

Next, another embodiment of the brittle portion formed in the coupling tooth will be described with reference to FIG. 16. Although in each of the above-described embodiments, the slide fastener in which the brittle portion is formed in part of the coupling tooth formed by injection molding has been described, the present invention may be applied to slide fasteners using the zigzag-shape or coil-shape sequential coupling teeth (mono-filament made of synthetic resin). FIG. 16 is a perspective view of a zigzag-shape coupling tooth 412 in which the coupled ratio B expressed by an Expression 7 is set to 0.4 or less by setting a difference between the summit height H of a coupling head 470 of a coupling tooth 412 and the neck width D smaller than a typically used slide fastener while the brittle portion 80 is formed in part of the coupling tooth 412.

The coupling head 470 having the summit height H formed on one side edge of the zigzag-shape coupling tooth 412 as shown in FIG. 16. A first leg portion 472 and a second leg portion 473 extend branched from both ends of the coupling head 470. To sew the zigzag-shape coupling teeth 412 to the fastener tape, the core thread (not shown) is passed through the central portions of the zigzag-shape coupling teeth 412 communicating with each other and the coupling teeth 412 are sewed with the sewing thread (not shown) around the sewing portions of the first leg portion 472 and the second leg portion 473. In the meantime, the first leg portion 472 and the second leg portion 473 of each coupling tooth 412 are connected to the first leg portion 472 and the second leg portion 473 of a coupling tooth, which are adjacent with a turned back connecting portion 476 in between. The sewing portions of the first leg portion 472 and the second leg portion 473 are not a recess previously formed but a portion to be defined after the sewing. The sewing line, which is a straight line orthogonal to the fastener tape connecting both the sewing portions, is a line defined after the engaging element 412 is sewed on the fastener tape.

The brittle portion 80 having reduced rupture strength is formed in part of the first leg portion 472 in the zigzag-shape coupling tooth 412 by reducing its sectional area. The brittle portion 80 may be a groove formed by cutting the slide fastener in its longitudinal direction into a general V-shape or by melting using a heater or ultrasonic wave after the coupling tooth 412 made of synthetic resin mono-filament is molded.

Even if the coupling tooth 412 is broken at the brittle portion 80 due to an excessive lateral pulling force applied to the coupling tooth 412, broken piece of the coupling tooth 412 is held by the sewing thread or by the turned back connecting portion 476 because the brittle portion 80 cut out into the substantially V-shape is formed in part of the coupling head 470 closer to the coupling head 470 rather than the sewing portion of the zigzag-shape coupling tooth 412, thereby reducing an inconvenience that the broken piece is separated from the fastener tape.

Figure 17:
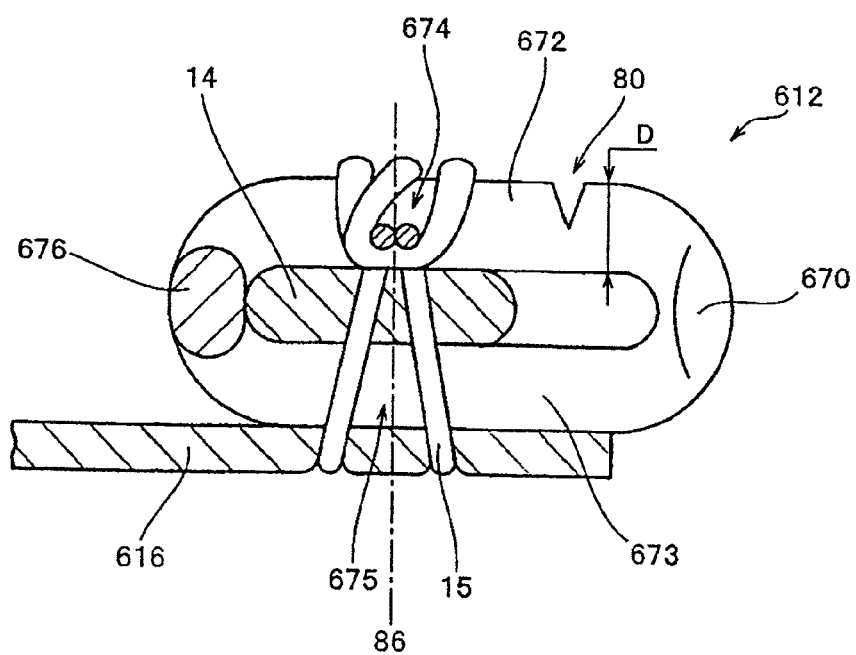
FIG. 17 is a view showing an embodiment in which the brittle portion having a reduced rupture strength is formed in part of the coil-shape coupling tooth.

Next, another embodiments of the brittle portion formed in the coupling tooth will be described with reference to FIG. 17. FIG. 17 is a view showing a state in which the coil-shape coupling teeth 612 are sewed on the coupling tooth attaching portion of the fastener tape 616 and a sectional view taken along an orthogonal line to the coupling axis of the slide fastener. In the coil-shape coupling tooth 612 shown in FIG. 17, the coupled ratio B expressed by the Expression 7 is set to 0.4 or less by setting a difference between the summit height H and the neck width D (not shown) of the coupling head 670 relatively smaller than a typically used slide fastener.

The coupling head 670 is formed on one side edge of the coil-shape coupling tooth 612 as shown in FIG. 17. A first leg portion 672 and a second leg portion 673 extend branched from both ends of the coupling head 670. To sew the coil-shape coupling tooth 612 on the fastener tape 616, the core thread 14 is passed through the central portions of the coil-shape coupling teeth 612 communicating with each other and the coupling teeth 612 are sewed with the sewing thread 15 around the sewing portion 674 of the first leg portion 672. At this time, a sewing portion 675 of the second leg portion 673 is nipped in the first leg portion 672 closer to the fastener tape 616, the sewing thread 15 is placed around only the first leg portion 672 and then, the sewing portion 675 of the second leg portion 673 is pressure bonded to the fastener tape 616 having the core thread 14 in between, and then the first leg portion 672 and the second leg portion 673 are sewed on the fastener tape 616. The first leg portion 672 and the second leg portion 673 of each coupling tooth 612 are connected to the second leg portion 673 and the first leg portion 672 of a coupling tooth, which are adjacent with a turned back connecting portion 676 in between. Here, a straight line orthogonal to the fastener tape 616 connecting the sewing portion 674 with the sewing portion 675 is defined as the sewing line 86.

The brittle portion 80 having reduced rupture strength by reducing its sectional area is formed at a position in an area from the sewing portion 674 of the first leg portion 672 to the sewing portion 675 in the second leg portion 673 (that is, on the side of the sewing line 86 closer to the coupling head 670) over the coupling head 670 in the coil-shape coupling tooth 612. This brittle portion 80 is a groove formed by cutting the slide fastener in its longitudinal direction into a general V-shape using a cutter or by melting using a heater or ultrasonic wave after the coupling tooth 612 made of synthetic resin mono-filament is molded.

Even if the coupling tooth 612 is broken at the brittle portion 80 due to an excessive lateral pulling force applied to the coupling tooth, any broken piece of the coupling tooth 612 is held by the sewing thread 15 or by the turned back connecting portion 676 because the brittle portion 80 is formed in the coil-shape coupling tooth 612 in this way, thereby reducing an inconvenience that any broken piece is separated from the fastener tape 616.

INDUSTRIAL APPLICABILITY

The slide fastener of the present invention can be applied to an inflation-out opening for the airbag but also to an inflation-out opening for a life jacket, which is inflated by inflation gas.

The invention claimed is:
1. A slide fastener, comprising:
a plurality of attachment leg portions of coupling teeth, on each of which, a coupling head formed to have a relatively large width and the attachment leg portions extending from the coupling head are formed, are attached on a coupling tooth attaching portion of each of a pair of fastener tapes on right and left with a predetermined pitch P [mm] along a tape longitudinal direction, and
wherein the coupling teeth are formed by injection molding or made of coil-shape or zigzag-shape mono-filament, wherein relationships among a summit height H [mm] of the coupling head formed to have a relatively large width, coupling tooth thickness T [mm] of the coupling head, and a pitch P [mm] satisfy both of the following:

$$0.4 \geq (2 \times H - P)/P \geq 0.1$$

$$0.2 \geq (2 \times H - P) \times T/(2 \times P)$$

where $(2 \times H-P)/P$ expresses a coupled ratio and $(2 \times H-P) \times T/(2 \times P)$ expresses a coupled sectional amount, and
wherein the coupling teeth are configured so that when a lateral pulling force of 40 N/cm or more is applied as a force per a unit length of a coupling line in a direction which is orthogonal to a coupling axis and a direction to separate the pair of the fastener tapes on right and left in a state where the coupling teeth attached to each of the pair of the fastener tapes are coupled with each other along the coupling axis, the coupling of the coupling teeth is released.

2. A slide fastener comprising;
a plurality of attachment leg portions of coupling teeth, on each of which, a coupling head formed to have a relatively large width and the attachment leg portions extending from the coupling head are formed, are attached on a coupling tooth attaching portion of each of a pair of fastener tapes on right and left with a predetermined pitch P [mm] along a tape longitudinal direction,
wherein the coupling teeth are made of coil-shape or zig-zag-shape mono-filament,
wherein relationships among the summit height H [mm] of the coupling head formed to have the relatively large width, a neck width D [mm] of the attachment leg portion and the pitch P [mm] satisfy both of the following:

$$0.4 \geq (2 \times H - P)/P \geq 0.1$$

$$0.2 \geq (2 \times H - P) \times (H - D)/(2 \times P)$$

where $(2 \times H-P)/P$ expresses a coupled ratio, and $(H-D)/(2 \times P)$ expresses a difference [mm] between the summit height H and the neck width D, and
wherein the coupling teeth are configured so that when a lateral pulling force of 40 N/cm or more is applied as a force per a unit length of a coupling line in a direction which is orthogonal to a coupling axis and a direction to separate the pair of the fastener tapes on right and left in a state where the coupling teeth attached to each of the pair of the fastener tapes are coupled with each other along the coupling axis, the coupling of the coupling teeth is released.

\* \* \* \* \*

UNITED STATES PATENT AND TRADEMARK OFFICE
CERTIFICATE OF CORRECTION

PATENT NO. : 8,590,117 B2
APPLICATION NO. : 12/920679
DATED : November 26, 2013
INVENTOR(S) : Kenji Dono et al.

It is certified that error appears in the above-identified patent and that said Letters Patent is hereby corrected as shown below:

In the Specifications

Column 16, line 9, Delete "coupling" and insert -- coupling tooth --, therefor.

Column 16, line 20, Delete "the a" and insert -- the --, therefor.

In the Claims

Column 19, line 20, In Claim 1, delete "comprising;" and insert -- comprising: --, therefor.

Signed and Sealed this
Twenty-fifth Day of February, 2014

Michelle K. Lee
*Deputy Director of the United States Patent and Trademark Office*